United States Patent
Coppola et al.

(10) Patent No.: US 10,486,378 B2
(45) Date of Patent: Nov. 26, 2019

(54) METHODS OF MANUFACTURING VEHICLE ASSEMBLIES

(71) Applicant: GM Global Technology Operations LLC, Detroit, MI (US)

(72) Inventors: Anthony M. Coppola, Royal Oak, MI (US); Hamid G. Kia, Bloomfield Hills, MI (US); Paul M. Najt, Bloomfield Hills, MI (US); Russell P. Durrett, Bloomfield Hills, MI (US); Michael A. Potter, Grass Lake, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 328 days.

(21) Appl. No.: 15/225,037

(22) Filed: Aug. 1, 2016

(65) Prior Publication Data

US 2018/0029316 A1 Feb. 1, 2018

(51) Int. Cl.
*B29C 70/68* (2006.01)
*B29C 70/70* (2006.01)
(Continued)

(52) U.S. Cl.
CPC .............. *B29C 70/70* (2013.01); *B29C 70/06* (2013.01); *B29C 70/48* (2013.01); *B29C 70/541* (2013.01);
(Continued)

(58) Field of Classification Search
CPC ....... B29C 70/70; B29C 70/48; B29C 70/541; B29C 70/86; B29C 70/06; B29C 70/682;
(Continued)

(56) References Cited

U.S. PATENT DOCUMENTS 1,534,411 A 4/1925 Potter
3,481,316 A 12/1969 Olson et al.
(Continued)

FOREIGN PATENT DOCUMENTS

CN 101967361 A 2/2011
CN 107672189 A 2/2018
(Continued)

OTHER PUBLICATIONS

Guimond et al.; "Composite V-6 Diesel Engine Concept;" SAE Technical Paper 920084; Feb. 1992; 8 pages.
(Continued)

*Primary Examiner* — Anthony Calandra
*Assistant Examiner* — Jerzi H Moreno Hernandez
(74) *Attorney, Agent, or Firm* — Harness, Dickey & Pierce, P.L.C.

(57) ABSTRACT

Methods of manufacturing vehicle assemblies, such as engine assemblies, are provided. The method includes arranging at least a first component in a mold, arranging a second component or a second component precursor adjacent to the first component in the mold, introducing a sacrificial material into the mold, introducing at least one polymeric fluid into the mold, solidifying the polymeric fluid, and removing the sacrificial material from the mold to form a void space so that the first component, the polymeric composite material, and the void space define the vehicle assembly.

15 Claims, 9 Drawing Sheets

(51) Int. Cl.
| | | |
|---|---|---|
| *F02F 7/00* | (2006.01) | |
| *B29L 31/30* | (2006.01) | |
| *B29C 70/06* | (2006.01) | |
| *B29C 70/54* | (2006.01) | |
| *B29C 70/48* | (2006.01) | |
| *B29C 70/86* | (2006.01) | |
| *B29L 31/00* | (2006.01) | |

(52) U.S. Cl.
CPC .......... *B29C 70/682* (2013.01); *B29C 70/683* (2013.01); *B29C 70/86* (2013.01); *F02F 7/00* (2013.01); *B29L 2031/30* (2013.01); *B29L 2031/749* (2013.01); *F02F 7/0085* (2013.01)

(58) Field of Classification Search
CPC ......... B29C 70/683; F02F 7/00; F02F 7/0085; B29L 2031/749; B29L 2031/30
See application file for complete search history.

(56) References Cited

U.S. PATENT DOCUMENTS

| | | | |
|---|---|---|---|
| 4,446,827 A | 5/1984 | Kubozuka | |
| 4,446,906 A * | 5/1984 | Ackerman | B22C 9/105 164/112 |
| 4,450,610 A * | 5/1984 | Schaper | B29C 53/76 156/173 |
| 4,659,268 A | 4/1987 | Del Mundo et al. | |
| 4,726,334 A | 2/1988 | Holtzberg et al. | |
| 4,848,292 A | 7/1989 | Holtzberg | |
| 4,901,692 A | 2/1990 | Madden | |
| 4,930,470 A * | 6/1990 | Kabat | F02F 7/0007 123/195 C |
| 5,062,393 A | 11/1991 | Smith et al. | |
| 5,083,537 A * | 1/1992 | Onofrio | F02F 1/108 123/195 C |
| 5,176,456 A | 1/1993 | Takebayashi et al. | |
| 5,207,120 A | 5/1993 | Arnold et al. | |
| 5,259,677 A | 11/1993 | Degrange et al. | |
| 5,301,423 A | 4/1994 | Clark et al. | |
| 5,370,087 A | 12/1994 | Guimond et al. | |
| 5,435,059 A | 7/1995 | Chawla | |
| 5,737,838 A * | 4/1998 | Niimi | B22D 19/0027 164/132 |
| 5,922,472 A | 7/1999 | Keener | |
| 5,947,667 A | 9/1999 | Cassatt et al. | |
| 6,134,881 A * | 10/2000 | Strasser | C04B 35/80 123/65 PE |
| 6,223,702 B1 | 5/2001 | Achenbach et al. | |
| 6,412,366 B1 | 7/2002 | Leith | |
| 6,684,844 B1 | 2/2004 | Wang et al. | |
| 6,959,683 B2 | 11/2005 | Gokan | |
| 7,191,770 B1 | 3/2007 | Anderson et al. | |
| 7,367,303 B2 | 5/2008 | Yamamoto et al. | |
| 7,819,462 B1 | 10/2010 | Owens | |
| 8,033,592 B2 | 10/2011 | Hsu et al. | |
| 8,109,492 B2 | 2/2012 | Winocur | |
| 8,757,028 B2 | 6/2014 | Broughton et al. | |
| 8,961,724 B2 | 2/2015 | Polewarczyk et al. | |
| 9,227,673 B2 | 1/2016 | Berger et al. | |
| 9,254,634 B2 | 2/2016 | Arbesman et al. | |
| 9,302,733 B2 | 4/2016 | Schlanger | |
| 9,416,749 B2 * | 8/2016 | Maki | F02F 1/18 |
| 9,463,502 B2 | 10/2016 | Arbesman et al. | |
| 9,527,132 B2 * | 12/2016 | Lowe | B22D 19/0054 |
| 9,707,733 B2 | 7/2017 | Arbesman et al. | |
| 9,950,449 B2 * | 4/2018 | Maki | B29C 33/52 |
| 10,093,042 B2 * | 10/2018 | Williams | B29C 43/003 |
| 10,125,809 B2 | 11/2018 | Coppola et al. | |
| 10,132,270 B2 | 11/2018 | Coppola et al. | |
| 10,267,261 B2 | 4/2019 | Coppola et al. | |
| 2002/0104505 A1 | 8/2002 | Ericson | |
| 2003/0183983 A1* | 10/2003 | Schmidt | B29C 33/52 264/317 |
| 2004/0226393 A1 | 11/2004 | Hong | |
| 2005/0128705 A1 | 6/2005 | Chu et al. | |
| 2006/0102110 A1 | 5/2006 | Takenaka et al. | |
| 2007/0277645 A1 | 12/2007 | Weisskopf et al. | |
| 2009/0126180 A1 | 5/2009 | Keener | |
| 2009/0223479 A1 | 9/2009 | Schoell | |
| 2011/0174246 A1* | 7/2011 | Graf | B22C 9/105 123/41.72 |
| 2011/0300333 A1 | 12/2011 | Kallinen | |
| 2012/0015134 A1* | 1/2012 | Walker | F16F 7/08 428/66.6 |
| 2012/0085313 A1 | 4/2012 | Reisser | |
| 2013/0065042 A1 | 3/2013 | Esser-Kahn et al. | |
| 2013/0189888 A1* | 7/2013 | Patrick | B29C 73/22 442/71 |
| 2014/0072386 A1 | 3/2014 | Baugh, Sr. | |
| 2014/0295323 A1* | 10/2014 | Schulze | H01M 8/04201 429/515 |
| 2015/0159581 A1* | 6/2015 | Maki | F02F 1/18 123/193.2 |
| 2016/0084295 A1 | 3/2016 | Murrish et al. | |
| 2016/0230696 A1* | 8/2016 | Williams | B29C 43/003 |
| 2016/0264082 A1 | 9/2016 | Berger et al. | |
| 2017/0023008 A1* | 1/2017 | Roche | F01D 5/282 |
| 2017/0074205 A1* | 3/2017 | Maki | F02F 1/20 |
| 2018/0030920 A1 | 2/2018 | Wicks et al. | |
| 2018/0030922 A1 | 2/2018 | Kia et al. | |
| 2018/0030924 A1 | 2/2018 | Coppola et al. | |
| 2018/0037510 A1 | 2/2018 | Durrett et al. | |
| 2018/0038276 A1 | 2/2018 | Durrett et al. | |
| 2018/0038308 A1 | 2/2018 | Durrett et al. | |
| 2018/0186144 A1 | 7/2018 | Durrett et al. | |
| 2019/0001587 A1 | 1/2019 | Coppola et al. | |
| 2019/0032700 A1 | 1/2019 | Coppola et al. | |
| 2019/0084370 A1 | 3/2019 | Coppola et al. | |

FOREIGN PATENT DOCUMENTS

| | | |
|---|---|---|
| CN | 107672196 A | 2/2018 |
| CN | 107676188 A | 2/2018 |
| CN | 107676189 A | 2/2018 |
| CN | 107676370 A | 2/2018 |
| DE | 3011358 A1 | 10/1981 |
| DE | 3013135 A1 | 10/1981 |
| DE | 19818589 A1 | 11/1999 |
| DE | 102012018330 A1 | 8/2013 |
| DE | 102013015431 A1 | 3/2015 |
| DE | 102014224827 A1 | 6/2015 |
| DE | 102017213313 A1 | 2/2018 |
| DE | 102017213315 A1 | 2/2018 |
| DE | 102017213316 A1 | 2/2018 |
| DE | 102017213317 A1 | 2/2018 |
| DE | 102017213319 A1 | 2/2018 |
| EP | 0341723 A2 | 11/1989 |
| EP | 0345424 A1 | 12/1989 |
| EP | 0361367 A2 | 4/1990 |
| EP | 0690956 B1 | 9/1999 |
| FR | 1593248 A | 5/1970 |
| JP | H0218405 A | 1/1990 |
| JP | 2012192543 A | 10/2012 |
| WO | 9520102 A1 | 7/1995 |
| WO | WO-2008085026 A1 | 7/2008 |
| WO | WO-20120117876 A1 | 9/2012 |
| WO | WO-2014153065 A1 | 9/2014 |

OTHER PUBLICATIONS

Esser-Kahn et al.; "Three-Dimensional Microvascular Fiber-Reinforced Composites;" Advanced Materials; vol. 23; 2011; pp. 3654-3658.

Brosius et al.; "Phenolics for High Temperature Applications in Small Engine Technologies (Cost Effective Performance Advantages);" SAE Technical Paper 951809; 1995; pp. 405-414.

Buckley et al.; "A Prediction of Weight Reduction and Performance Improvements Attainable through the use of Fiber Reinforced Composites in I.C. Engines;" SAE Technical Paper 2005-01-3693; Oct. 2005; 17 pages.

(56) References Cited

OTHER PUBLICATIONS

"Dow Introduces Bonding Process;" Materials Today; http://www.materialstoday.com/carbon-fiber/news/dow-introduces-bonding process; May 10, 2016; 1 page.

First Office Action in German Application No. 102017213316.3 from the German Patent Office dated Apr. 4, 2018 and correspondence from Manitz, Finsterwald & Partner summarizing the First Office Action; 6 pages.

Second Office Action in German Application No. 102017213316.3 from the German Patent Office dated Jun. 7, 2018 and correspondence from Manitz, Finsterwald & Partner summarizing contents; 6 pages.

Coppola, Anthony M. et al., U.S. Appl. No. 15/981,190, filed May 16, 2018 entitled "Vascular Polymeric Assembly," 40 pages.

Coppola, Anthony M. et al., U.S. Appl. No. 15/989,988, filed May 25, 2018 entitled "Apparatus for Cooling an Electric Motor and Method of Making the Same," 69 pages.

Coppola, Anthony M. et al., U.S. Appl. No. 16/108,449, filed Aug. 22, 2018 entitled "Polymeric and Metal Cylinder Head and Method of Making the Same," 67 pages.

Coppola, Anthony M. et al., U.S. Appl. No. 16/148,634, filed Oct. 1, 2018 entitled "Assemblies Having Enhanced Heat Transfer Through Vascular Channels and Methods of Manufacturing Assemblies Having Vascular Channels," 67 pages.

First Office Action in Chinese Patent Application No. 201710647860.8 dated Jan. 28, 2019 with English language machine translation, 10 pages.

First Office Action in Chinese Patent Application No. 201710645156.9 dated Feb. 15, 2019 with English language machine translation, 9 pages.

First Office Action in Chinese Patent Application No. 201710649399.X dated Mar. 14, 2019 with English language machine translation, 14 pages.

First Office Action in Chinese Patent Application No. 201710645761.6 dated Mar. 19, 2019 with correspondence dated Mar. 26, 2019 from China Patent Agent (H.K.) Ltd. summarizing contents, 9 pages.

\* cited by examiner

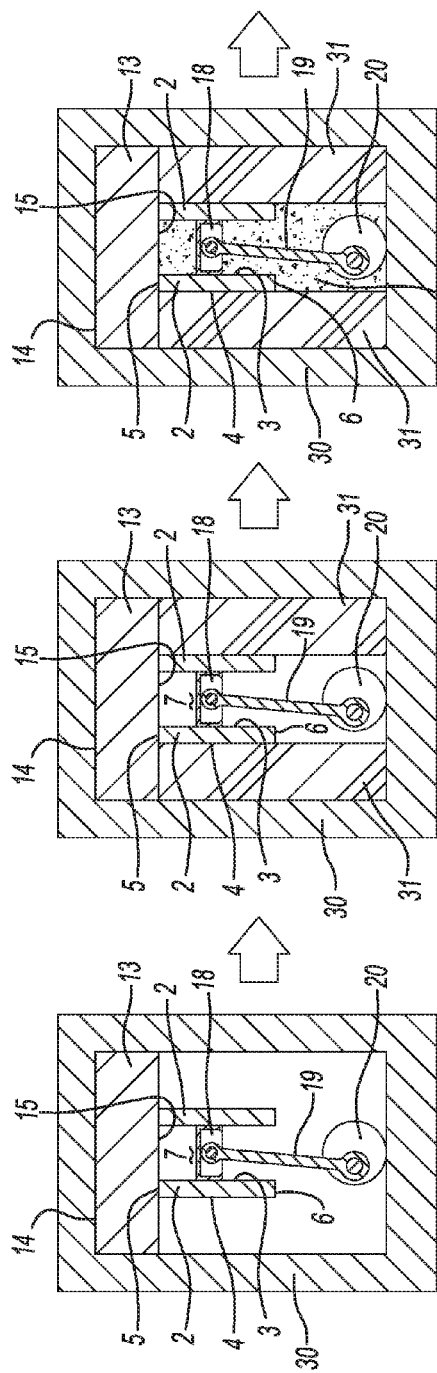

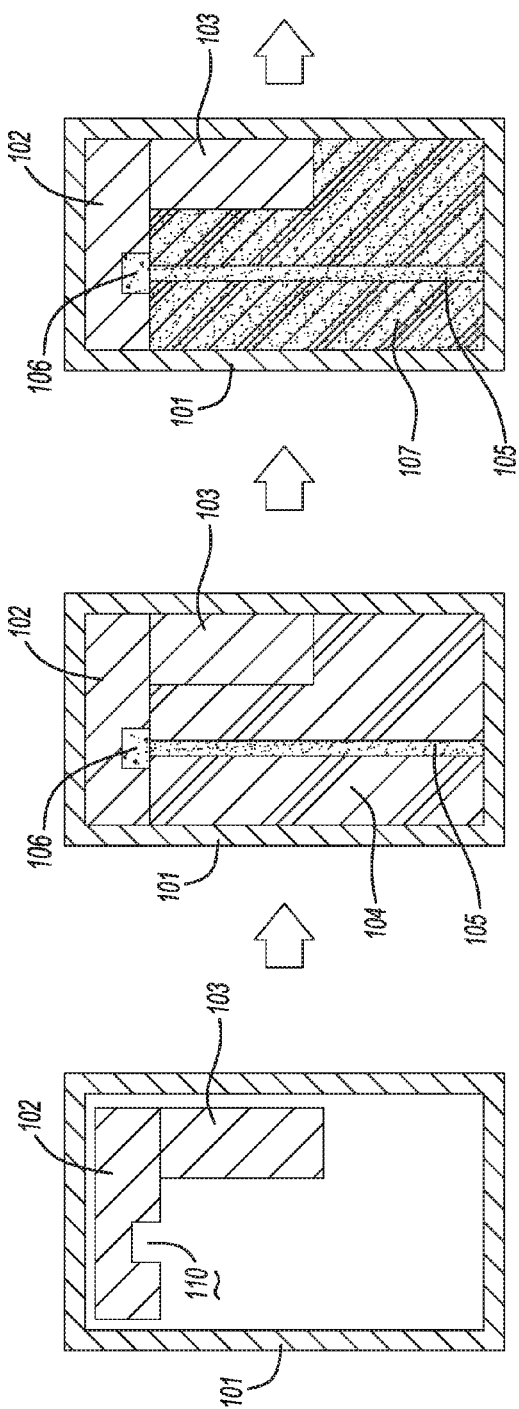

METHODS OF MANUFACTURING VEHICLE ASSEMBLIES

FIELD

The present disclosure relates to methods of manufacturing vehicle assemblies, such as engine assemblies, by incorporating a sacrificial material for maintaining a void space in the assembly defined between polymeric composite components and metal or ceramic components in the vehicle assemblies.

BACKGROUND

This section provides background information related to the present disclosure which is not necessarily prior art.

Traditionally, engine components for automotive applications have been made of metals, such as steel and iron. Metals components are robust, typically having good ductility, durability, strength and impact resistance. While metals have performed as acceptable engine components, they have a distinct disadvantage in being heavy and reducing gravimetric efficiency, performance and power of a vehicle thereby reducing fuel economy of the vehicle.

Weight reduction for increased fuel economy in vehicles has spurred the use of various lightweight metal components, such as aluminum and magnesium alloys as well as use of light-weight reinforced composite materials. While use of such lightweight materials can serve to reduce overall weight and generally may improve fuel efficiency, issues can arise when using such materials in an engine assembly due to high operating temperatures associated with the engine assembly. For example, the lightweight metal components can also have relatively high linear coefficients of thermal expansion, as compared to traditional steel or ceramic materials. In engine assemblies, the use of such lightweight metals can cause uneven thermal expansion under certain thermal operating conditions relative to adjacent components having lower linear coefficients of thermal expansion, like steel or ceramic materials, resulting in separation of components and decreased performance. Additionally, lightweight reinforced composite materials may have strength limitations, such as diminished tensile strength, and they can degrade after continuous exposure to high temperatures. Thus, lightweight engine assemblies having increased durability under high temperature operating conditions along with enhanced methods of heat transfer (e.g., heating and cooling) for such engine assemblies are needed to further improve efficiency of operation and fuel economy. However, manufacturing such lightweight engine assemblies which have a combination of lightweight materials and traditional materials can require multiple steps (e.g., machining, die casting, molding) which increases costs and production time. Furthermore, manufacturing complex assemblies requiring void spaces between components becomes far more challenging when incorporating components formed from composite materials. Such composite materials may have inherent temperature limits to avoid potential damage and may require formation by different techniques, including in situ formation within the assembly. Therefore, methods of manufacturing such lightweight engine assemblies in an efficient and cost-effective manner while providing the capability to create complex assembly architectures with intact void spaces are also needed.

SUMMARY

This section provides a general summary of the disclosure, and is not a comprehensive disclosure of its full scope or all of its features.

In certain aspects, the present disclosure provides a method for manufacturing a vehicle assembly. The method may comprise arranging at least a first component in a mold and arranging a second component or a second component precursor adjacent to the first component in the mold, wherein the second component or second component precursor is or forms a polymeric composite material comprising a polymer and a plurality reinforcing fibers in the vehicle assembly. The method may further comprise introducing a sacrificial material into the mold, introducing at least one polymeric fluid into the mold, and removing the sacrificial material from the mold to form a void space so that the first component, the polymeric composite material, and the void space define the vehicle assembly. The at least one polymeric fluid may be selected from the group consisting of a sealant and a resin. In certain aspects, the resin may be introduced into one or more regions of the second component precursor to form the polymeric composite material.

In other aspects, the present disclosure provides a method for manufacturing an engine assembly. The method may comprise arranging at least a first component comprising a metal material or a ceramic material in a mold and arranging a second component precursor in the mold adjacent to at least a portion of the first component, wherein the second component precursor forms a polymeric composite material comprising a polymer and a plurality reinforcing fibers in the vehicle assembly. The method may further comprise introducing a sacrificial material into the mold, introducing at least one polymeric fluid into the mold, wherein the at least one polymeric fluid comprises a resin, curing the resin to form the polymeric composite material, and removing the sacrificial material from the mold to form a void space in the engine assembly so that the first component, the polymeric composite material, and the void space define the engine assembly.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 1a-1e shows schematics illustrating manufacturing of a vehicle assembly according to certain aspects of the present disclosure.

FIGS. 3a-3d show schematics illustrating manufacturing of an alternative vehicle assembly according to certain aspects of the present disclosure.

Corresponding reference numerals indicate corresponding parts throughout the several views of the drawings.

DETAILED DESCRIPTION

Figure 2A:
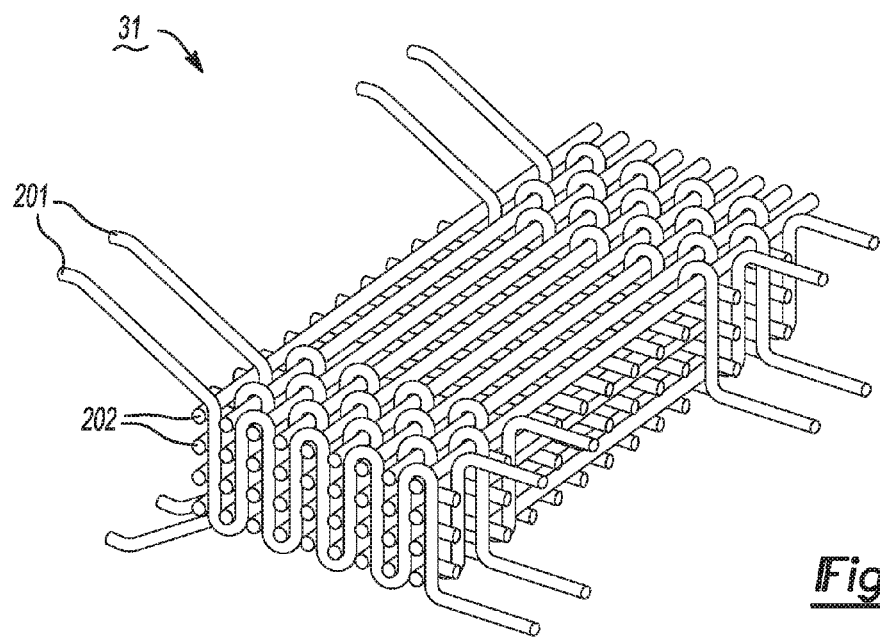
FIGS. 2a-2e shows schematics illustrating formation of microchannels in a polymeric composite material according to certain aspects of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," "attached to" or "coupled to" another element or layer, it may be directly on, engaged, connected, attached or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," and the like). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

It should be understood for any recitation of a method, composition, device, or system that "comprises" certain steps, ingredients, or features, that in certain alternative variations, it is also contemplated that such a method, composition, device, or system may also "consist essentially of" the enumerated steps, ingredients, or features, so that any other steps, ingredients, or features that would materially alter the basic and novel characteristics of the invention are excluded therefrom.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters.

In addition, disclosure of ranges includes disclosure of all values and further divided ranges within the entire range, including endpoints and sub-ranges given for the ranges.

In a vehicle, such as an automobile, an engine is a power source that produces torque for propulsion. The engine is an assembly of parts, including cylinder liners, pistons, crankshafts, combustion chambers, and the like. In a four stroke internal combustion engine each piston has an intake stroke, a compression stroke, a power stroke, and an exhaust stroke. During the intake stroke, a piston moves downward and an inlet valve is opened to permit a gaseous air mixture to fill a combustion chamber. During the compression stroke, intake and exhaust valves are closed and the piston moves upward to compress the gaseous air mixture. During the power stroke, the gaseous air mixture in the combustion chamber is ignited by a spark plug and the rapidly expanding combustion gases drive the piston downward. During the exhaust stroke, the exhaust valve is opened and the piston moves upward to discharge the combustion gases (exhaust gases). Overall, during internal combustion, the engine components may be subjected to varying amounts of stresses as well as varying temperatures due to the exothermic combustion reactions occurring in the engine block.

As discussed above, as weight of engine components within a given architecture increases, power, fuel economy, and efficiency may decrease. Thus, it is desirable to include various lightweight components, such as lightweight metals and lightweight composite material, in engine assemblies instead of the traditional steel and/or iron components to decrease weight of the engine but also to maintain structural integrity of the engine. In addition to inclusion of lightweight materials, suitable cooling and/or heating of the engine assembly is also desirable to maintain longevity of the engine assembly.

Thus, methods of manufacturing vehicle assemblies, such as engine assemblies, are provided herein which includes use of a combination of components formed of lightweight materials and traditional materials as well as a sacrificial material for maintaining a void space in the vehicle assemblies. Advantageously, the methods described herein reduce the number of steps and costs associated with manufacturing vehicle assemblies having a combination of lightweight material components and traditional material components, especially those with complex architectures including one or more void spaces. Further, such methods may result in vehicle assemblies (e.g., engine assemblies) with improvements in noise, vibration and harshness. While the methods described herein are particularly suitable for manufacturing components of an automobile, they may also be used in a variety of other vehicles. Non-limiting examples of vehicles that can be manufactured by the current technology include automobiles, tractors, buses, motorcycles, boats, mobile homes, campers, aircrafts (manned and unmanned) and tanks.

Thus, the present disclosure contemplates methods for manufacturing vehicle assemblies (e.g., engine assemblies), which include combinations of traditional metal components, lightweight metal components and/or polymeric composite components as well as a sacrificial material for maintaining a void space in the vehicle assemblies. In particular, methods for manufacturing vehicle assemblies are provided herein. The method may comprise arranging at least a first component in a mold and arranging a second component, a second component precursor, or defined void space for receiving the second component precursor adjacent to the first component in the mold.

The first component may be metal (e.g. steel, iron, magnesium alloy, aluminum alloy, metal composite), ceramic (e.g., alumina, silicon carbide, ceramic composite) or a polymeric material as described herein. The first component may be any suitable component of a vehicle assembly. Non-limiting examples of a first component include a liner defining an open void cylindrical region for receiving a piston, a piston, a crankshaft, a connecting rod, a cylinder head, a bulkhead, a crankcase housing, head fasteners, fluid channels, and combinations thereof. It is contemplated herein that a combination of first components (i.e., multiple components) can be arranged in the mold. For example, as best shown in FIG. 1a, a liner 2, which defines an open void cylindrical region 7 can be arranged in the mold 30. The liner 2 may be any suitable metal or ceramic material as described above. The liner 2 generally may be cylindrically shaped and have hollow interior. In certain variations, the liner 2 is a metal material (e.g. steel, iron, magnesium alloy, aluminum alloy, metal composite). The liner 2 has an interior surface 3, an opposing exterior surface 4, a first terminal surface 5 and an opposing second terminal surface 6. Additionally or alternatively, a cylinder head 13 having a fifth terminal surface 14 and an opposing sixth terminal surface 15 may be arranged in mold 30, for example, such that at least a portion of the sixth terminal surface 15 may be adjacent to the first terminal surface 5 of the liner 2. The cylinder head 13 may be any suitable material, such as but not limited to metal (e.g. steel, iron, magnesium alloy, aluminum alloy, metal composite) or ceramic (e.g., alumina, silicon carbide magnesium alloy, aluminum alloy, metal composite)). In certain variations, the cylinder head 13 is a metal material (e.g. steel, iron, magnesium alloy, aluminum alloy, metal composite). Additionally or alternatively, a piston 18 connected to a crankshaft 20 via a connecting rod 19 may also be arranged in the mold 30. The piston 18, connecting rod 19, and the crankshaft 20 may be any suitable material, e.g., metal, ceramic, polymeric composite, and combinations thereof. As will be appreciated by those of skill in the art, the engine mold 30 shown in FIG. 1a depicts a single piston 18 and single open void cylindrical region 7 and associated componentry, but may in fact include a plurality of pistons, open void cylindrical regions 7, and associated components described above. The various components in the mold 30 may be held in place by a jig.

The second component or second component precursor may be or may form a polymeric composite material comprising a polymer and a plurality reinforcing fibers in the vehicle assembly. Examples of suitable polymers include, but are not limited to a thermoset, a thermoplastic resin, elastomer and combination thereof. Preferable polymers include, but are not limited to epoxies, phenolics, vinylesters, bismaleimides, polyether ether ketone (PEEK), polyamides, polyimides and polyamideimides. Examples of suitable reinforcing fibers include, but are not limited to carbon fibers, glass fibers, aramid fibers, polyethylene fibers, organic fibers, metallic fibers, and combinations thereof. In particular, the reinforcing fibers are glass fibers and/or carbon fibers. The reinforcing fibers may be continuous fibers. Advantageously, the housing 8 comprising a polymeric composite material as described herein may have a compression strength of about 100 MPa to about 2000 MPa, about 500 MPa to about 1000 MPa or about 1000 MPa to about 1500 MPa.

Polymeric composites can be formed by using strips of the composite precursor material, such as a fiber-based material (e.g., cloth or graphite tape). The composite may be formed with one or more layers, where each layer can be formed from contacting and/or overlapping strips of the fiber-based material. The fiber-based substrate material may also comprise a resin. The resin can be solidified (e.g., cured or reacted) after the fiber-based material is applied to the work surface (e.g., opposing exterior surface 4 of liner 2) and thus can serve to bond single or multiple layers together in the polymeric composite.

Various methods are typically employed for introducing resin to impregnated fiber-based substrate composite material systems: wet winding (or layup), pre-impregnating (referred to as "pre-preg"), and resin transfer molding. For wet winding, a dry fiber reinforcement material can be wetted with the resin as it is used, usually by submersion through a bath. For pre-impregnating (pre-preg), the resin is wetted into the fiber-based material in advance, and usually includes a step of partially curing the resin to have a viscous or tacky consistency (also known as a B-stage partial cure), and then winding up the pre-preg fiber-based material for later use. Pre-preg composite material systems tend to use thermoset resin systems, which can be cured or reacted by elevated temperatures with cure or reaction times ranging from about 1 minute to about 2 hours (depending on the cure or reaction temperatures). However, some pre-preg materials may employ resins that cure or react with actinic radiation (e.g., ultraviolet radiation (UV)). For resin transfer molding, dry fiber reinforcement material may be placed into a mold and resin may be infused into the mold under pressure (e.g., about 10 psi to about 2000 psi). Injection molding techniques known in the art may also be used to introduce resin into the reinforcement material, particularly where the reinforcement material comprise discontinuous fibers. For example, a precursor comprising a resin and the reinforcement material may be injected or infused into a defined space or mold followed by solidification of the precursor to form the polymeric composite material. The term "injection molding" also includes reaction injection molding using at thermoset resin.

In certain other aspects, the present teachings also contemplate an attaching step where a reinforcement material is applied, for example, via filament winding, braiding or weaving near, within, and/or over the work surface (e.g., opposing exterior surface 4 of liner). The method may optionally comprise applying or introducing an uncured or unreacted resin composition into or onto the fiber-based reinforcement material. By applying, it is meant that the uncured or unreacted resin composition is wetted out onto the fiber-based material and thus may be coated on a surface of the fiber-based material or imbibed/impregnated into the reinforcement fiber-based material (for example, into the pores or openings within the reinforcement fiber-based material). After the resin is introduced to the regions having the reinforcement material, followed by solidifying (e.g., curing or reacting) to form the polymeric composite. Pre-preg fiber-based material may be applied via filament winding, braiding or weaving as well.

In certain variations, as shown in FIG. 1b, a second component precursor 31 may be arranged in the mold 30. The second component precursor 31 may comprise one or more layers, where each layer can be formed from contacting and/or overlapping reinforcing fibers to form an interwoven preform of reinforcing fibers in a desired shape for the vehicle assembly, e.g., in the shape of a housing. For example, a detailed view of the second component precursor 31 is shown in FIG. 2a where a second component precursor 31 comprises interwoven reinforcing fibers. For example, in FIG. 2a, a plurality of first reinforcing fibers 201 (e.g., carbon fibers, glass fibers) are woven through a plurality of second reinforcing fibers 202 (e.g., carbon fibers, glass fibers) having a different orientation to form a three dimensional woven structure. The first reinforcing fibers 201 and the second reinforcing fibers 202 can be the same or different fibers. It should be noted that other weaving patterns are also contemplated and not limited to the patterns shown in FIGS. 2a-2e, which are merely example embodiments.

Additionally or alternatively, the method may comprise arranging a defined void space for receiving the second component precursor adjacent to the first component in the mold. The defined void space may be defined by a metal or polymer boundary present in the mold, which delineates the shape of the intended second component, e.g., a housing.

The method further comprises introducing a sacrificial material into the mold to maintain an intended void space between the various components arranged in the mold. For example, as shown in FIG. 1c, a sacrificial material 32, may be introduced into the mold 30. The sacrificial material may be introduced into the mold as a solid or a fluid. For example, as a solid, the sacrificial material may be formed into an intended shape and introduced into the mold. Alternatively, as a fluid, the sacrificial material may be contained in a bladder and introduced into the mold.

The sacrificial material comprises a material along with the aforementioned bladder, which can withstand solidification of the polymeric composite (e.g., resin infusion and curing), but is capable of vaporizing, melting, etching or dissolving under conditions which do not substantially vaporize, melt or dissolve the first component (e.g., liner 2, cylinder head 13, piston 18, etc.) or the second component or the second component precursor. For example, the sacrificial material may vaporize or melt at a suitable temperature (e.g., about 150° C. to about 200° C.) above the solidification temperature (e.g., curing or reacting temperature) but below a degradation temperature of the polymeric composite material (e.g., second component). Any suitable solvent, such as, but not limited to acetone, may be applied to the sacrificial material to dissolve it, optionally with agitation, so long as the solvent does not substantially degrade or dissolve the first component (e.g., liner 2, cylinder head 13, piston 18, etc.) or the second component or the second component precursor. If injection molding is utilized, the sacrificial material may be dissolved with a suitable solvent. Alternatively, the sacrificial material may be etched using a suitable acid (e.g., hydrochloric acid, sulfuric acid, nitric acid, and the like). Examples of suitable sacrificial materials include, but are not limited to metals, ceramics and polymers. Non-limiting metals may include solders, which comprise lead, tin, zinc, aluminum, suitable alloys and the like. Non-limiting ceramics may include sand. Non-limiting polymers may include polyvinyl acetate, polylactic acid, polyethylene, polystyrene. Additionally or alternatively, the sacrificial material may further be treated with a catalyst or chemically modified to alter melting or degradation behavior. The method further comprises introducing at least one polymeric fluid into the mold. The polymeric fluid may be any suitable sealant for sealing or adhering the components in the mold together and/or a resin for infusing in the second component precursor for forming the polymeric composite material, so that the resin can be further processed (e.g., cured) to form the polymer in the polymeric composite material. Non-limiting examples of suitable sealants include, but are not limited to silicone, epoxy, polyurethane and the like. Non-limiting examples of suitable resins include, but are not limited to elastomer, thermoset resin and thermoplastic resin, such as, e.g., epoxies, phenolics, vinylesters, bismaleimides, polyether ether ketone (PEEK), polyamides, polyimides and polyamideimides and combinations thereof. The sacrificial material in the mold prevents the polymeric fluid from flowing into a space where the sacrificial material is present thereby maintaining any intended void space between the various components arranged in the mold. Thus, advantageously, a suitable resin may be introduced into the mold to form the polymeric composite material adjacent to the already arranged first component(s) whereby the resin may be prevented from flowing into intended void spaces, e.g., the open void cylindrical region 7, because the sacrificial material is present. In certain aspects, the resin may be introduced into one or more regions of the second component precursor (e.g., via one or more inlets in the mold), which may be in the form of a reinforcement material such as a plurality of reinforcing fibers, so that the resin is introduced into pores and around the reinforcement material, but is not introduced into regions where the sacrificial material is present. Consequently, the vehicle assembly can be formed with a minimal amount of process steps. Additionally or alternatively, a sealant may be introduced into the mold to seal or adhere various components together (e.g., cylinder head 13 with liner 2), but the sealant may be prevented from flowing into places where not needed because of the presence of the sacrificial material.

In certain aspects, where the second component precursor comprising the plurality of reinforcing fibers described herein (e.g., carbon fibers, glass fibers) is arranged in the mold, the polymeric fluid introduced into the mold may be the resin described herein (e.g., thermoset, thermoplastic). In certain aspects where a second component precursor is disposed in the mold, the plurality of reinforcing fibers may be introduced and arranged after the sacrificial material has been introduced into the mold, although in alternative variations, the plurality of reinforcing fibers can be introduced before the sacrificial material, but protected from the sacrificial material, e.g., the sacrificial material may be contained in a bladder or separated from the reinforcing fibers by an impermeable film (e.g., metal or polymer film). Following introduction of the resin into the mold, the method may further comprise forming the polymeric composite material by solidifying (e.g., curing or reacting) the at least one polymeric fluid in the mold. For example, a resin may be cured by elevated temperatures with cure times ranging from about 1 minute to about 2 hours (depending on the cure temperatures). As shown in FIG. 1d, polymeric composite housing material 33 is formed after the resin is introduced and solidified. In other variations, a second component precursor may be injection molded or otherwise applied or arranged in the mold (e.g., may be pre-formed and disposed in the mold), which may be followed by solidified curing to form the polymeric composite material.

In certain variations, arranging the defined void space for receiving the second component precursor may further comprise introducing the second component precursor and the polymeric fluid (e.g., resin), separately or together, into the defined void space, e.g., by injection molding.

The method further comprises removing the sacrificial material from the mold to form a void space so that the first component, the polymeric composite material, and the void space define the vehicle assembly. For example, as illustrated in FIG. 1e, a void space 34 remains after the sacrificial material 32 is removed. Removing the sacrificial material may include treating (e.g., heating) the sacrificial material to volatilize, melt, etch or degrade the sacrificial material or dissolving the sacrificial material to produce degradants as described herein. The sacrificial material may be heated to a temperature of about 150° C. to about 200° C. as described herein. The sacrificial material may be dissolved with any suitable solvent, such as, but not limited to acetone, optionally with agitation. Alternatively, the sacrificial material may be etched using a suitable acid (e.g., hydrochloric acid, sulfuric acid, nitric acid, and the like). If the sacrificial material is contained in a bladder, the bladder may be pierced to produce degradant. The degradants may be removed (e.g., via one or more outlets and/or removal pathways in the mold) to form a void space in the vehicle assembly, e.g., by applying a vacuum to the mold. It is understood herein, although not shown, one or more other void spaces may be formed by the methods described herein. Non-limiting examples of such void spaces include at least one coolant channel, oil channels, fastener channels, space for the crankshaft to rotate, open void cylindrical region where the piston travels, and the like.

Figure 2B:
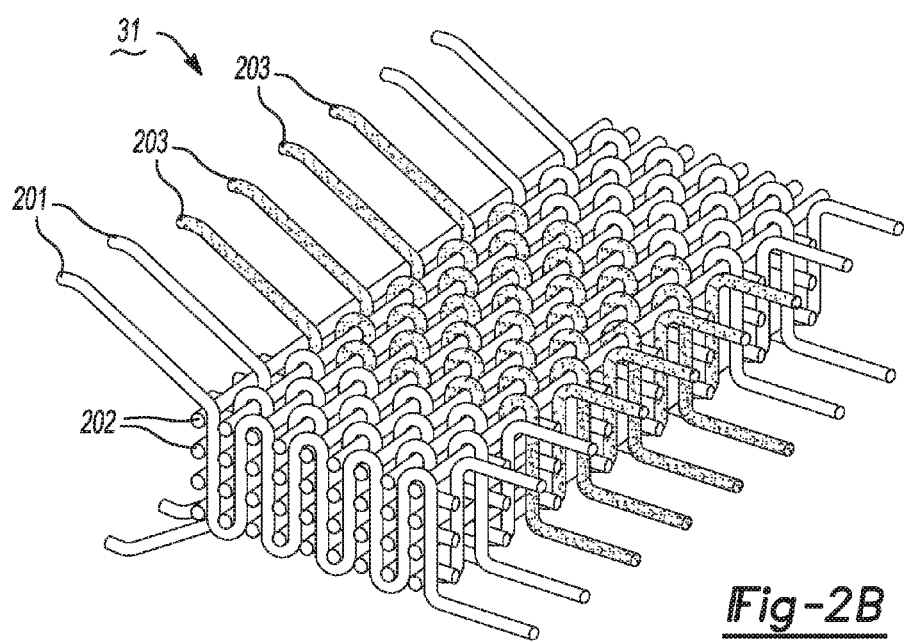

In certain other aspects, the present teaching also contemplates a process of using sacrificial fibers to form microchannels in the polymeric composite. As shown in FIG. 2a, a second component precursor 31 may comprise interwoven first reinforcing fibers 201 (e.g., carbon fibers, glass fibers) and second reinforcing fibers 202 (e.g., carbon fibers, glass fibers) to form a three dimensional woven structure. The first reinforcing fibers 201 and the second reinforcing fibers 202 can be the same or different fibers. Sacrificial fibers 203 can be woven into the composite woven preform 200 along with the first reinforcing fibers 201, as shown in FIG. 2b. The first reinforcing fibers 201 and the sacrificial fibers 203 can be directed through the second reinforcing fibers 202 sinusoidally. As noted above, other weaving patterns are also contemplated and not limited to the patterns shown in FIGS. 2a-2e, which are merely example embodiments. The sacrificial fibers 203 comprise a material, which can withstand weaving with the first reinforcing fibers 201 and/or the second reinforcing fibers 202 as well as solidification of the polymeric composite (e.g., resin infusion and curing), but is capable of vaporizing, melting, etching or dissolving under conditions which do not substantially vaporize, melt, etch or dissolve other components of the polymeric composite (e.g., reinforcing fibers). Examples of suitable sacrificial fiber materials include, but are not limited to metals and polymers. Non-limiting metals may include solders, which comprise lead, tin, zinc, aluminum, suitable alloys and the like. Non-limiting polymers may include polyvinyl acetate, polylactic acid, polyethylene, polystyrene. Additionally or alternatively, the sacrificial fibers may further be treated with a catalyst or chemically modified to alter melting or degradation behavior. The sacrificial fibers described herein and the sacrificial material described herein may be formed of the same or different material.

Figure 2C:
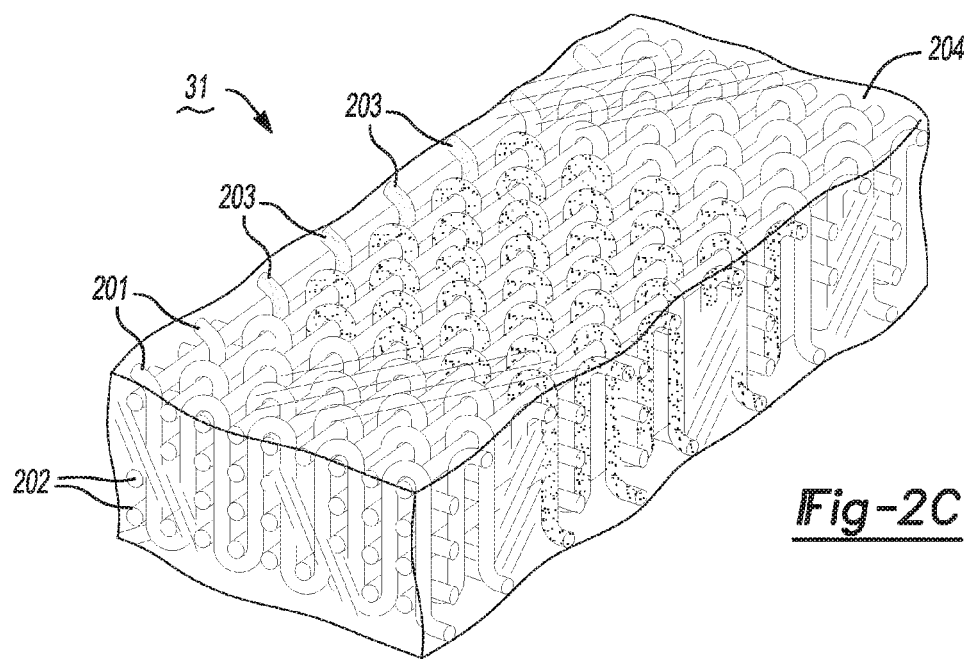
Figure 2D:
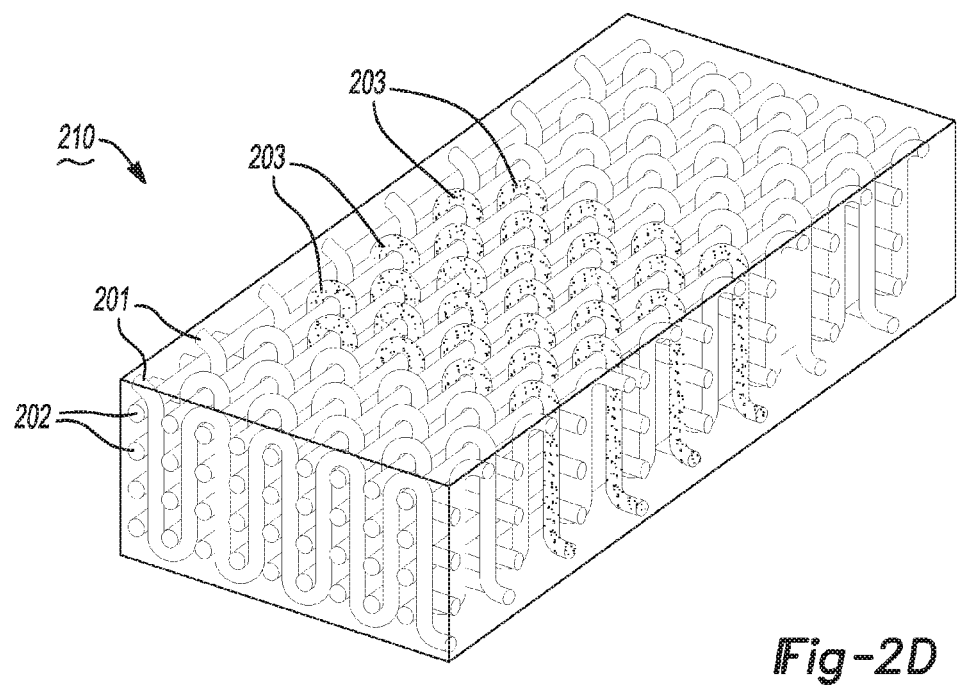
Figure 2E:
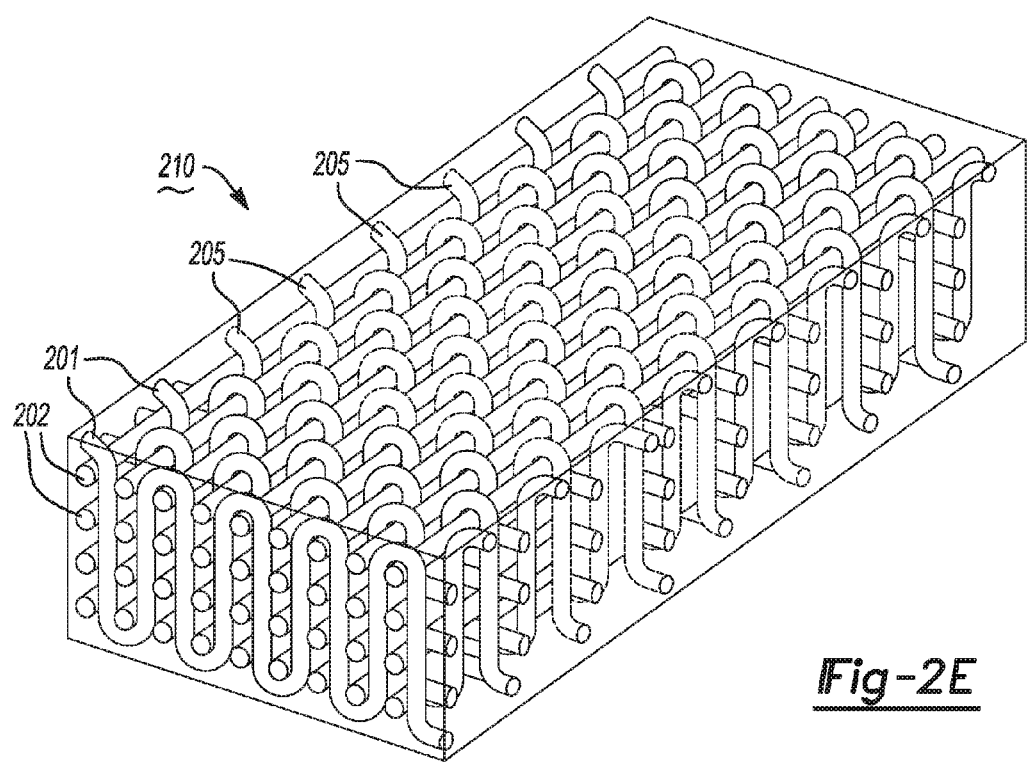

Following introduction of a resin (e.g., the polymeric liquid) into the second component precursor 31, the second component precursor 31 is solidified (e.g., reacted or cured) under suitable conditions, as shown in FIGS. 2c and 2d, respectively, to form polymeric composite 210. After solidifying (e.g., reacting or curing), the method may further comprise removing the plurality of sacrificial fibers from the polymeric composite 210 to form microchannels 205 in the polymeric composite 210. In particular, the polymeric composite 210 may be further treated (e.g. heated) to volatilize, melt or degrade the sacrificial fibers 203 or the sacrificial fibers 203 may be dissolved to produce degradants. For example, the sacrificial fibers may be heated to a temperature (e.g., about 150° C. to about 200° C.) that substantially vaporizes or melts the sacrificial fibers but does not substantially degrade the reinforcing fibers and/or the solidified resin. Any suitable solvent, such as, but not limited to acetone, may be applied to the sacrificial fibers to dissolve them, optionally with agitation, so long as the solvent does not substantially degrade or dissolve the reinforcing fibers and/or the cured resin. Alternatively, the sacrificial fibers may be etched using a suitable acid (e.g., hydrochloric acid, sulfuric acid, nitric acid, and the like). The degradants may be removed to form microchannels 205 in the polymeric composite 210, e.g., by applying a vacuum to the polymeric composite or introducing a gas to the polymeric composite to expel the degradants out of the polymeric composite. The removal of the sacrificial material and the removal of sacrificial fibers may be performed separately (e.g., in two separate steps) or together (e.g., in one step).

Additionally or alternatively, it is contemplated herein that varying dimensions and configurations of sacrificial fibers may incorporated into the reinforcing fibers to form other channels or void spaces. For example, further sacrificial fibers may be incorporated into the reinforcing fibers to form supply channels for the microchannels described herein.

The microchannels 205 and/or the supply channels are capable of receiving a heat transfer fluid for heating and/or cooling the vehicle assembly. Examples of suitable heat transfer fluids include, but are not limited to air, water, oil, ethylene glycol, propylene glycol, glycerol, methanol, and combinations thereof. The air may be supplied from an air conditioning system or produced from movement of the vehicle. The heat transfer fluid may be supplied by at least one pump (not shown) from at least one supply reservoir or supply channel (not shown) to at least one inlet (not shown) in the microchannels 205 in the vehicle assembly. The pump and supply reservoir may be present adjacent to the engine assembly. The heat transfer fluid may be at supplied at a suitable temperature to cool and/or heat the vehicle assembly, e.g., about 10° C. to about 120° C., about 20° C. to about 100° C. or about 20° C. to about 90° C. Optionally, the heat transfer fluid may flow through a cooler (not shown) to further reduce the temperature of the heat transfer fluid or the heat transfer fluid may flow through a heater (not shown) to increase the temperature of the heat transfer fluid.

The microchannels 205 may have a substantially round cross-section. As understood herein, "substantially round" may include circular and oval cross-sections and the dimensions of the cross-section may deviate in some aspects. The microchannels 205 may have a diameter of less than about 8,000 μm. Additionally or alternatively, the microchannels 205 have a diameter of about 0.1 μm to about 8,000 μm, 0.1 μm to about 5,000 μm, 0.1 μm to about 1,000 μm, about 1 μm to about 500 μm or about 1 μm to about 200 μm. Additionally or alternatively, the microchannels 205 may have a substantially rectangular cross-section. As understood herein, "substantially rectangular" may include square cross-sections and the dimensions of the cross-section may deviate in some aspects. Preferably, at least a portion of the microchannels 205 are interconnected, which may prevent blockages. The microchannels 205 may be oriented in any suitable direction, for example, axially, radially, spiral, branched, intersecting, criss-crossing and combinations thereof.

In certain variations, the supply channel may be machined or formed in the first component and sacrificial material as described herein and/or sacrificial fibers as described herein may be used in the methods described herein to maintain a supply channel void space. For example, as shown in 3*a*, a cylinder head 102 and liner 103 (e.g., first components) may be arranged in a mold 101. The cylinder head 102 defines a supply channel void space 110. Preferably, the cylinder head 102 and liner 103 are the same material (e.g. ceramic, metal). The cylinder head 102 and liner 103 may be integrally joined as separate components or integrally joined as the same component. As shown in FIG. 3*b*, second component precursor 104 comprising reinforcing fibers as described herein and sacrificial fibers 105 as described herein may be arranged adjacent to the cylinder head 102 and liner 103, and a sacrificial material 106 as described herein may be introduced into the supply channel void space 110. Alternatively, sacrificial fibers 105 may be introduced into the supply channel void space 110. A resin as described herein may be introduced into mold 101 and infused into the second component precursor 104, and the resin may be solidified (e.g., cured or reacted) to form polymeric composite housing 107, as shown in FIG. 3*c*. The sacrificial material 106 and the sacrificial fibers 105 may be removed as described herein to form supply channel void space 110 in cylinder head 102 and microchannels 109 as described herein in polymeric composite housing 107 adjacent to cylinder head 102 and liner 103.

Additionally or alternatively, the second component precursor and/or the polymeric composite may include a plurality of microspheres (not shown) for improved heat transfer. The microspheres may be ceramic or glass, and optionally, may be coated with a metal, ceramic and/or nanoparticles. Preferably, the coating has a high thermal conductivity, e.g., aluminum, copper, tin and the like. The microspheres may have a diameter of less than about 1,000 μm. Additionally or alternatively, the microspheres have a diameter of about 0.1 μm to about 1,000 μm, about 1 μm to about 500 μm or about 1 μm to about 200 μm.

Figure 4:
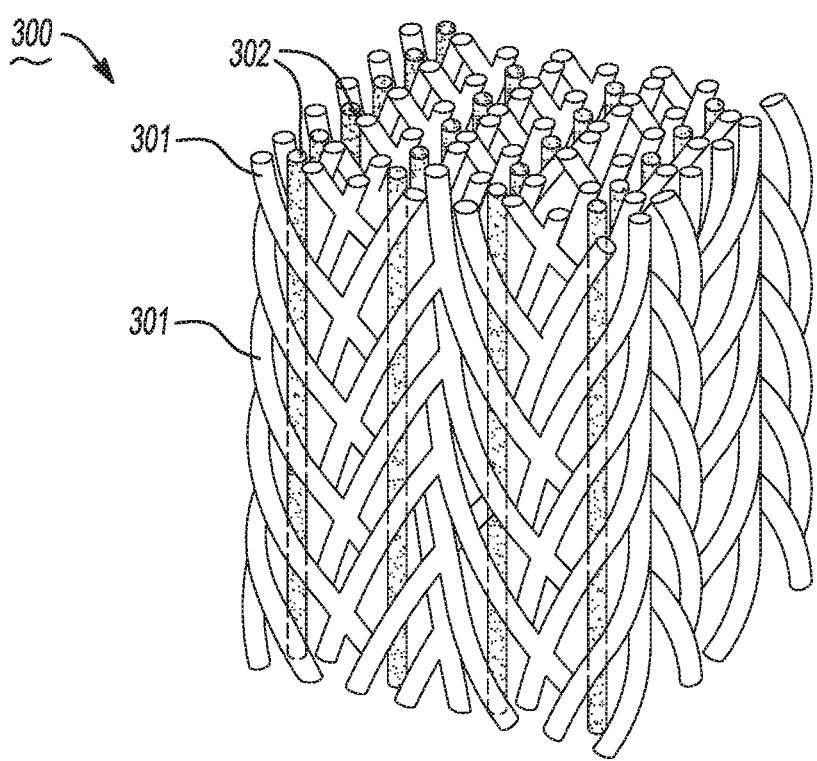
FIG. 4 shows a polymeric composite material including reinforcing fibers and at least one wire.
Figure 5:
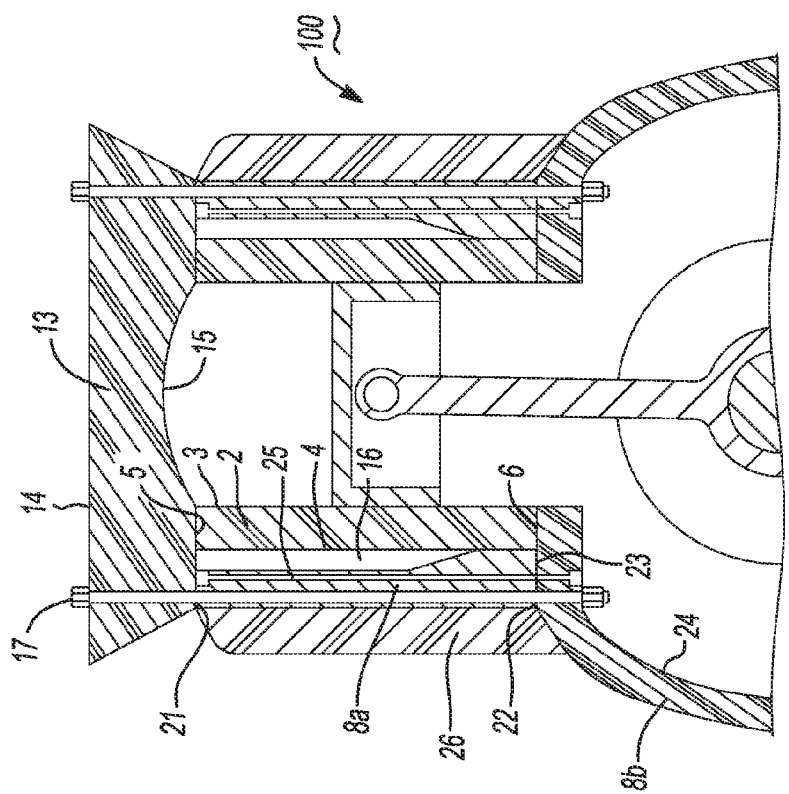
FIG. 5 shows a cross-sectional view of a vehicle assembly manufactured according to certain aspects of the present disclosure.

Additionally or alternatively, the second component precursor and/or the polymeric composite material may include at least one wire for heating the vehicle assembly. For example, as shown in FIG. 4, one or more wires 302 may be incorporated or woven into reinforcing fibers 301 (e.g., carbon fibers) in the polymeric composite 300. The wires 302 may be comprise any material suitable for conducting electricity (e.g., copper, Nichrome, and the like). The wires 302 may be insulated from the reinforcing fibers 301. For example, the wires 302 may include a suitable insulative coating, such as a polymer coating and/or a braided glass fiber sheath. To heat the wires 302, electricity is provided by a battery or other suitable external source (not shown) and controlled by a control unit (not shown). Referring to FIG. 5 for example, although not shown, a person of ordinary skill in the art appreciates that the wires 302 may be included in the housing 8 in addition to or instead of the plurality of microchannels 25.

In a particular embodiment, the second component precursor and/or the polymeric composite comprises one or more of: (i) a plurality of microchannels as described herein; (ii) at least one wire as described herein; and (iii) a plurality of microspheres as described herein. Additionally or alternatively, the polymeric composite housing comprises two or more of (i), (ii) and (iii) (e.g., (i) and (ii), (i) and (iii), (ii) and (iii)). Additionally or alternatively, the polymeric composite housing comprises (i), (ii) and (iii).

In certain other aspects, vehicle assemblies formed by the methods described herein are contemplated. For example, as shown in FIG. 5, the present disclosure contemplates that the first component is a liner 2 as described herein and the polymeric composite material comprises a housing 8 formed around at least a portion of the exterior surface 4 of the liner 2 in vehicle assembly 1. The housing 8 has an interior surface 9, an opposing exterior surface 10, a third terminal surface 11, and an opposing fourth terminal surface 12. A layer of polymeric composite (e.g., comprising discontinuous fibers) (not shown) may also be present between the exterior surface 4 of the liner 2 and the interior surface 9 of the housing 8.

Additionally or alternatively, the first component may further comprise a cylinder head 13 as described above. At least a portion of the sixth terminal surface 15 of the cylinder head 13 may be arranged adjacent to the first terminal surface 5 of the liner 2. The liner 2 may be held in place by its contact with the cylinder head 13 and housing 8. Optionally, a coolant channel 16 may be defined between at least a portion of the exterior surface 4 of the liner 2, an interior surface 9 of the housing 8 and the sixth terminal surface 15 of the cylinder head 13. If more than one liner is present, there may be a continuous coolant channel 16 adjacent to each liner or there may be discrete coolant channels corresponding to each liner. The coolant channel 16 is capable of receiving a suitable heat transfer fluid as described herein for cooling a vehicle assembly (e.g., engine assembly). In particular, the heat transfer fluid is a mixture of water and ethylene glycol. The heat transfer fluid may be supplied by at least one pump (not shown) from at least one supply reservoir or supply channel (not shown) to at least one inlet (not shown) in the coolant channel 16. The heat transfer fluid may be circulated through the coolant channel 16 at a temperature of about 70° C. to about 140° C., about 80° C. to about 130° C., or about 90° C. to about 120° C. The pump and supply reservoir may be present adjacent to the engine assembly. Optionally, the heat transfer fluid may flow through a cooler (not shown) to further reduce the temperature of the heat transfer fluid or the heat transfer fluid may flow through a heater (not shown) to increase the temperature of the heat transfer fluid. One of ordinary skill in the art appreciates that the heat transfer fluid may be supplied to one or more coolant channels as necessary.

Figure 6:
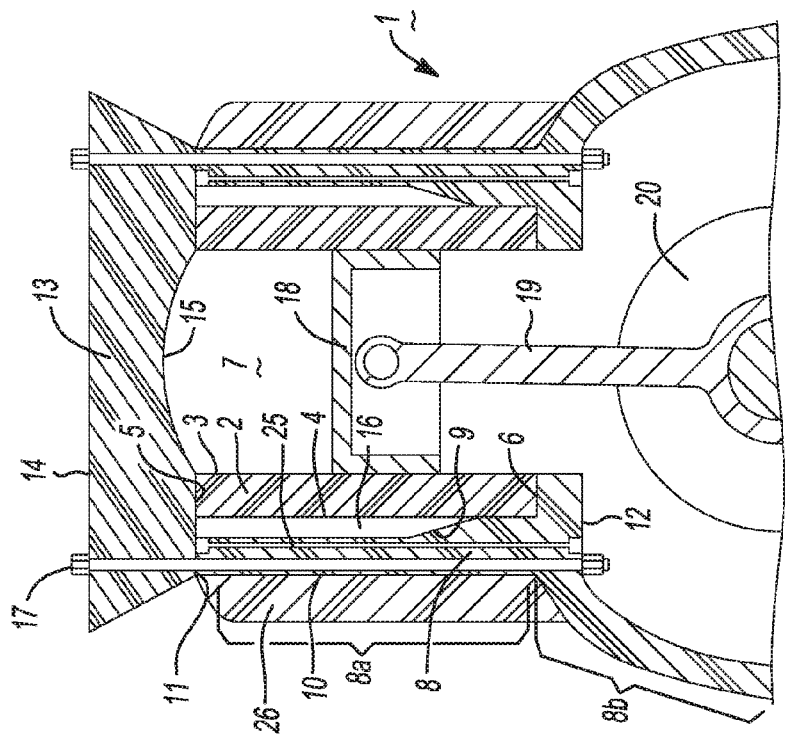
FIG. 6 shows a cross-sectional view of an alternative vehicle assembly manufactured according to certain aspects of the present disclosure.

In various embodiments, the housing 8 comprises a cylinder housing portion 8*a* and crank housing portion 8*b*. The cylinder housing portion 8*a* and the crank housing portion 8*b* may be integrally formed, as shown in FIG. 5. Alternatively, as shown in FIG. 6, the cylinder housing portion 8*a* and the crank housing portion 8*b* may be distinct components joined together via an adhesive (not shown) or with a plurality of fasteners 17 in vehicle assembly 100. With reference to FIG. 5, the cylinder housing portion 8*a* has a seventh terminal surface 21 and an opposing eighth terminal surface 22. The crank housing portion 8*b* has a ninth terminal surface 23 and an opposing tenth terminal surface 24. The ninth terminal surface 23 of the crank housing portion is adjacent to the second terminal surface 6 of the liner 2 and the eighth terminal surface 22 of the cylinder housing portion 8*a*. The seventh terminal surface 21 of the cylinder housing portion 8*a* may be adjacent to the sixth terminal surface 15 of the cylinder head 13.

In certain variations, the method may further comprise fastening the first component and the polymeric composite material together by any suitable fasteners as described herein. For example, the cylinder head 13, cylinder housing portion 8*a*, the crank housing portion 8*b*, and/or liner 2 may be coupled together by any suitable fasteners as described herein. For example, a plurality of fasteners 17 (e.g. bolts) may join together the cylinder head 13 and the cylinder housing portion 8*a*, the crank housing portion 8*b*. The plurality of fasteners 17 may comprise any suitable material, such as, but not limited to, metal, polymeric composites and combinations thereof. Additionally or alternatively, a suitable sealant (not shown) and/or gasket (not shown) may be present between at least a portion of the sixth terminal surface 15 of the cylinder head 13, at least a portion of the first terminal surface 5 of the liner 2, and/or a least a portion of the seventh terminal surface 21 of the cylinder housing portion 8*a*.

Figure 7:
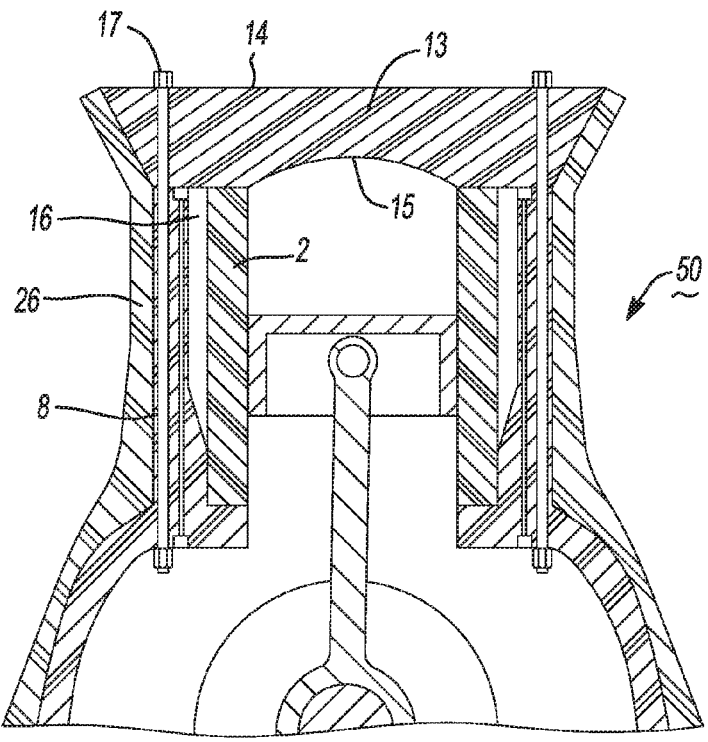
FIG. 7 shows a cross-sectional view of an alternative vehicle assembly manufactured according to certain aspects of the present disclosure.

Additionally or alternatively, the method may further comprise forming a polymeric composite layer around at least a portion of the vehicle assembly (e.g. engine assembly). For example, as shown in FIG. 5, a polymeric composite layer 26 disposed around at least a portion of the exterior surface 10 of the housing 8. The polymeric composite layer 26 may serve as a mechanical, chemical and/or thermal shield for the engine assembly. The polymeric composite layer 26 may comprise a suitable polymer and plurality of suitable reinforcing fibers. Examples of suitable polymers include, but are not limited to a thermoset, a thermoplastic resin, elastomer and combinations thereof. Preferable polymers include, but are not limited to epoxies, phenolics, vinylesters, bismaleimides, polyether ether ketone (PEEK), polyamides, polyimides and polyamideimides. Examples of suitable reinforcing fibers include, but are not limited to carbon fibers, glass fibers, aramid fibers, polyethylene fibers, ceramic fibers, organic fibers, metallic fibers, and combinations thereof. In particular, the reinforcing fibers are glass fibers and/or carbon fibers. The reinforcing fibers may be discontinuous fibers. The polymeric composite layer 26 may be formed by injection molding by placing the vehicle assembly in a second mold. Additionally or alternatively, the polymeric composite layer 26 may extend around at least a portion of the cylinder head 13 in vehicle assembly 50, as shown in FIG. 7. Further, as shown in FIG. 7, the polymeric composite layer 26 may be formed to extend substantially all of the exterior surface 10 of the housing 8. Additionally or alternatively, the polymeric composite layer 26 may extend around any other suitable surface of the vehicle assembly, e.g., around an oil pan, around a cam cover. Additionally or alternatively, the polymeric composite layer 26 may extend around any peripheral systems of the vehicle assembly, e.g., water pump, air conditioner, turbocharger. Alternatively, it is contemplated herein, that instead of utilizing a polymeric composite layer 26, a metal layer or ceramic layer may be used in its place. Such a polymeric composite layer 26, metal layer or ceramic layer may seal the outside of the engine assembly and prevent leakage of fluid from between the various components in the engine assembly and may avoid the need for the use of gaskets for sealing the engine assembly.

In other variations, polymeric composites used herein for the housing 8 and/or the polymeric composite layer 26 may be made by any other suitable methods known in the art, e.g., pultrusion, reaction injection molding, injection molding, compression molding, prepreg molding (in autoclave or as compression molding), resin transfer molding, and vacuum assisted resin transfer molding. Further, fiber precursors may be made by any other suitable methods known in the art, e.g., braiding, weaving, stitching, knitting, prepregging, hand-layup and robotic or hand placement of tows.

Figure 8A:
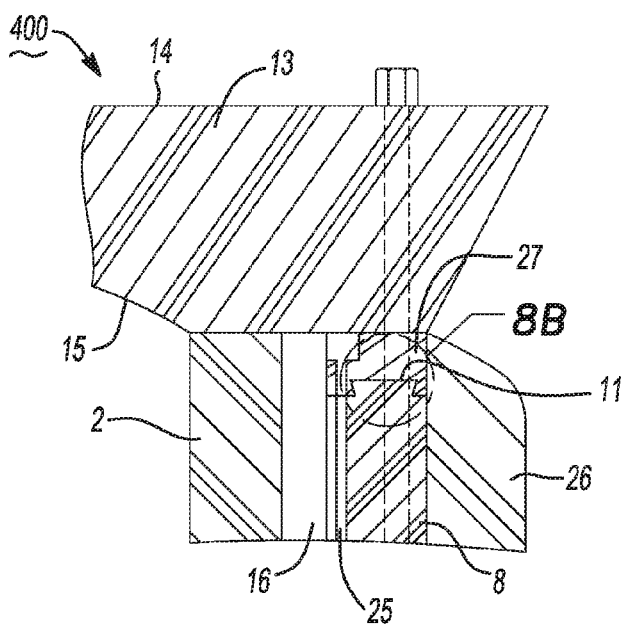
FIGS. 8a-8b shows a cross-sectional view of an alternative vehicle assembly manufactured according to certain aspects of the present disclosure.
Figure 8B:
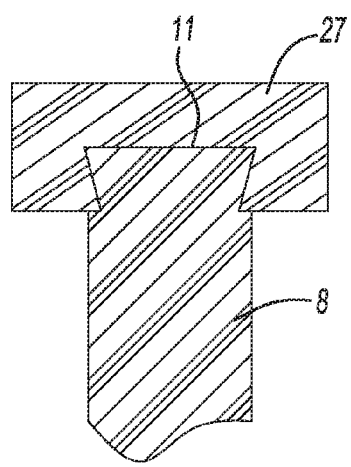

In various aspects, as shown in FIGS. 8*a* and 8*b*, a vehicle assembly 400 is contemplated, which includes a cap 27 as further component for arranging in the mold. The cap 27 may be arranged to be adjacent to a third terminal surface 11 of the housing 8 and the sixth terminal surface 15 of the cylinder head 13. The cap 27 may be any suitable material, such as a metal, ceramic, or polymeric composite material. In particular, the cap 27 is metal (e.g., steel, iron, magnesium alloy, aluminum alloy), especially when the housing 8 is a polymeric composite because cap 27 may be more machinable than the polymeric composite. The cap 27 may serve as a mating surface between the cylinder head 13 and the housing 8. Preferably, the cap 27 and the liner 2 are the same material (e.g., metal) so that they may both be machined or formed together in preparation for a head gasket and/or the cylinder head 13. The cap 27 may be joined to the housing 8 with a suitable adhesive or directly molded with the housing 8. Additionally or alternatively, the fastener 17 may couple together the cylinder head 13, the cap 27 and/or the housing 8. Additionally or alternatively, a second cap (not shown) similar to the cap 27 may be arranged adjacent to the eighth terminal surface 22 of the cylinder housing portion 8*a* and the ninth terminal surface 23 of the crank housing portion 8*b*.

Figure 9:
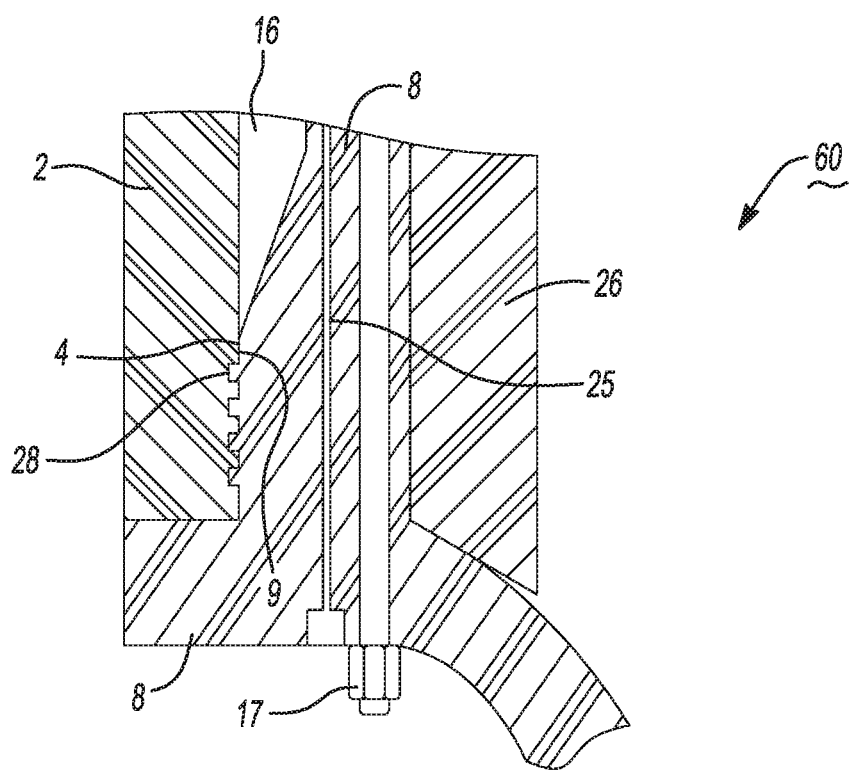
FIG. 9 shows a cross-sectional view of an alternative vehicle assembly manufactured according to certain aspects of the present disclosure.

In other variations, it is further contemplated that one or more of the components described herein include one or more mechanical interlock features for coupling together the various engine components. For example, complementary protruding flanges, grooves, channels, locking wings of differing shapes could be used as mechanical interlock features. In particular, as shown in FIG. 9 in alternative vehicle assembly 60, the method may further comprising forming one or more mechanical interlock features 28 on at least a portion of the exterior surface 4 of the liner 2 for coupling with the housing 8 (e.g., interior surface 9), particularly where the housing 8 is a polymeric composite material. Additionally or alternatively, the cap 27 and or the third terminal surface 11 of the housing 8 may include one or more mechanical interlock (not shown) features for coupling the cap 27 with the housing 8.

Optionally, the first component may be pretreated prior to arranging the first component in the mold to further enhance assembly of the various components. Pretreating of the first component may comprise or more of the following: cleaning, abrading, etching, applying a chemical primer (e.g., methyl ethyl ketone), and forming at least one mechanical interlock feature as described above in the first component. Etching can include electroetching (electroplating) or rinsing the first component with a suitable acid as described above. Abrading can include sandblasting the surface of the first component or rubbing sandpaper over the surface of the first component followed by rinsing with a solvent (e.g., acetone). Additionally or alternatively, ceramic material may be arranged between various metal and polymeric composite components in the engine assembly for insulation purposes. It is understood herein that the various metal components described herein can be readily machined or cast.

In another particular embodiment, the present disclosure contemplates a method for manufacturing an engine assembly (e.g., engine block). The method may comprise arranging at least a first component as described herein (e.g., a liner defining an open void cylindrical region for receiving a piston, a piston, a crankshaft, a connecting rod, a cylinder head, a bulkhead, a crankcase housing, head fasteners, fluid channels, and combinations thereof) in a mold. The first component may comprise a metal material or ceramic material. The method comprises arranging a second component precursor as described herein in a mold adjacent to at least a portion of the first component, wherein the second component precursor forms a polymeric composite material as described herein comprising a polymer (e.g., thermoplastic or thermoset resin) and a plurality reinforcing fibers as described herein (e.g., carbon fibers, glass fibers, aramid fibers, polyethylene fibers, ceramic fibers, organic fibers, metallic fibers, and combinations thereof) in the vehicle assembly. The second component precursor may comprise the plurality of reinforcing fibers. The method comprises introducing a sacrificial material as described herein (e.g. a polymer, a ceramic, a metal) into the mold and introducing at least one polymeric fluid into the mold, wherein the at least one polymeric fluid comprises a resin as described herein (e.g., thermoplastic or thermoset resin). The resin may be cured as describe herein to form the polymeric composite material. The method further comprises removing the sacrificial material as described herein (e.g., by heating the sacrificial material, by dissolving the sacrificial material) from the mold to form a void space in the engine assembly so that the first component, the polymeric composite material, and the void space define the engine assembly.

Additionally or alternatively, the polymeric composite material comprises a housing as described herein (e.g., housing 8) formed around at least a portion of an exterior surface of the liner, wherein the polymeric composite material comprises a plurality of reinforcing continuous fibers selected from the group consisting of: carbon fibers; glass fibers; and combinations thereof.

Additionally or alternatively, the second component precursor may further comprise a plurality of sacrificial fibers as described herein. The method may further comprise removing the plurality of sacrificial fibers from the polymeric composite material to form a plurality of microchannels as described herein (e.g., microchannels 205) in the polymeric composite material. Additionally or alternatively, the second component precursor and/or the polymeric composite material may further comprise a plurality of microspheres as described herein and/or at least one wire as described herein.

Additionally or alternatively, the method may further comprise forming a polymeric composite layer as described herein around at least a portion of the engine assembly.

As will be appreciated by those of skill in the art, while particular embodiments refer to components and methods for manufacturing an engine assembly (e.g., engine block), the methods describe herein also apply to manufacturing of additional vehicle assemblies, e.g., a transmission, a battery case, an electronics module, and the like.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for manufacturing a vehicle assembly, wherein the method comprises:

arranging at least a first component in a mold, the first component being a liner defining an open void cylindrical region for receiving a piston;

introducing a housing-shaped preform in the mold, the housing-shaped preform comprising a plurality reinforcing fibers;

introducing a sacrificial material into the mold such that the sacrificial material fills the mold;

introducing at least one polymeric fluid into the mold, wherein the at least one polymeric fluid comprises a resin;

forming an intermediate vehicle assembly by solidifying the resin to form a polymer, the intermediate vehicle assembly comprising the first component and a second component, the second component comprising a polymeric composite material comprising the polymer and the plurality of reinforcing fibers, the sacrificial material being in direct contact with the first component and the second component, the second component forms a housing around at least a portion of an exterior surface of the liner; and forming the vehicle assembly by removing the sacrificial material from the intermediate vehicle assembly to form a void space.

2. The method of claim 1, wherein the removing the sacrificial material comprises dissolving or heating the sacrificial material.

3. The method of claim 1, wherein the sacrificial material comprises a metal material, a ceramic material, or a polymer material.

4. The method of claim 1, wherein the first component comprises a metal material, a polymeric composite material or a ceramic material.

5. The method of claim 1 further comprising extending a plurality of fasteners through the first component and the second component after the forming of the intermediate vehicle assembly.

6. The method of claim 1 further comprising pretreating the first component, wherein the pretreating comprises one or more of: cleaning the first component; abrading the first component; and forming at least one mechanical interlock feature in the first component.

7. The method of claim 1 further comprising forming a polymeric composite layer around the vehicle assembly.

8. The method of claim 7, wherein the polymeric composite layer comprises discontinuous carbon fibers.

9. The method of claim 1, wherein:
the step of introducing the housing-shaped preform comprises arranging the housing-shaped preform in the mold prior to the step of introducing the at least one polymeric fluid; and
the step of introducing the at least one polymeric fluid comprises infusing at least a portion of the resin into the plurality of reinforcing fibers.

10. The method of claim 9, wherein the second component precursor further comprises a plurality of sacrificial fibers, and the method further comprises removing the plurality of sacrificial fibers to form a plurality of microchannels in the polymeric composite material after the forming the intermediate vehicle assembly.

11. The method of claim 10, wherein the removing the sacrificial material and the removing the plurality of sacrificial fibers are performed concurrently.

12. The method of claim 1, wherein the sacrificial material is disposed between the first component and the second component in the intermediate vehicle assembly.

13. A method for manufacturing an engine assembly, wherein the method comprises:
arranging at least a first component comprising a metal material or ceramic material in a mold, the first component being a liner defining an open void cylindrical region for receiving a piston;
arranging a housing-shaped second component precursor in the mold adjacent to at least a portion of the first component, wherein the housing-shaped second component precursor comprises a plurality of reinforcing fibers;
after the arranging of the first component and the housing-shaped second component precursor, introducing a sacrificial material into the mold such that at least some of the sacrificial material is disposed in direct contact with the first component and the housing-shaped second component precursor;
after the arranging of the second component precursor and the introducing of the sacrificial material, introducing at least one polymeric fluid into the mold, the at least one polymeric fluid comprising a resin, wherein at least a portion of the resin is infused into the housing-shaped second component precursor;
forming an intermediate engine assembly by solidifying the resin to form a polymer, the intermediate engine assembly comprising the first component and a second component, the second component comprising a polymeric composite material comprising the polymer and the plurality of reinforcing fibers, the second component forms a housing around at least a portion of an exterior surface of the liner; and
forming the engine assembly by removing the sacrificial material from the intermediate engine assembly to form a void space.

14. The method of claim 13, wherein the plurality of reinforcing fibers is selected from the group consisting of: carbon fibers; glass fibers; and combinations thereof.

15. The method of claim 13, wherein the second component precursor further comprises a plurality of sacrificial fibers; and the method further comprises removing the plurality of sacrificial fibers to form a plurality of microchannels in the polymeric composite material.

* * * * *